US 7,981,196 B2

(12) United States Patent
Kang et al.

(10) Patent No.: US 7,981,196 B2
(45) Date of Patent: Jul. 19, 2011

(54) APPARATUS AND METHOD FOR RECOVERING CARBON DIOXIDE FROM FLUE GAS USING AMMONIA WATER

(75) Inventors: Ki Joon Kang, Seoul (KR); Young Bong Lee, Gyeongsangbuk-do (KR); Kwang Hyun Kim, Seoul (KR); Je Young Kim, Gyeongsangbuk-do (KR)

(73) Assignees: POSCO (KR); Research Institute of Industrial Science & Technology (KR)

( * ) Notice: Subject to any disclaimer, the term of this patent is extended or adjusted under 35 U.S.C. 154(b) by 498 days.

(21) Appl. No.: 12/131,452

(22) Filed: Jun. 2, 2008

(65) Prior Publication Data

US 2008/0307968 A1     Dec. 18, 2008

(30) Foreign Application Priority Data

Jun. 4, 2007    (KR) ................... 10-2007-0054533
Oct. 16, 2007   (KR) ................... 10-2007-0104012

(51) Int. Cl.
  *B01D 53/14*         (2006.01)
(52) U.S. Cl. ............... 95/183; 95/199; 95/193; 95/236; 95/209; 95/228; 96/234; 96/242
(58) Field of Classification Search .......... 95/199, 95/178, 183, 236, 228, 229, 193, 209; 96/179–180, 96/193–194, 183, 234, 242, 266
See application file for complete search history.

(56) References Cited

U.S. PATENT DOCUMENTS

| | | | | |
|---|---|---|---|---|
| 2,878,099 A * | 3/1959 | Spolders et al. | ............... | 423/233 |
| 3,438,614 A * | 4/1969 | Lipinski | ................. | 261/98 |
| 3,926,591 A * | 12/1975 | Wildmoser et al. | ............. | 95/180 |
| 4,678,648 A * | 7/1987 | Wynn | ............................ | 423/228 |
| 4,977,745 A * | 12/1990 | Heichberger | ................. | 62/619 |
| 5,335,504 A * | 8/1994 | Durr et al. | ................. | 62/632 |
| 5,966,958 A * | 10/1999 | Maynard | ....................... | 62/277 |
| 6,342,091 B1 * | 1/2002 | Menzel et al. | ................. | 95/167 |
| 7,147,691 B2 * | 12/2006 | Palmer | .......................... | 95/186 |
| 7,192,468 B2 * | 3/2007 | Mak et al. | ...................... | 95/160 |
| 7,377,967 B2 * | 5/2008 | Reddy et al. | ................... | 96/242 |
| 7,424,808 B2 * | 9/2008 | Mak | ................................ | 62/625 |
| 7,641,717 B2 * | 1/2010 | Gal | ................................ | 95/187 |

FOREIGN PATENT DOCUMENTS

| | | |
|---|---|---|
| JP | 3929424 | 12/1939 |
| JP | 5184867 A | 7/1993 |
| KR | 100703999 B1 | 3/2007 |
| KR | 100703999 B1 * | 3/2007 |
| WO | WO 2004-026441 A1 * | 4/2004 |

OTHER PUBLICATIONS

Bai, Hsunling et al., "Removal of CO2 Greenhouse Gas by Ammonia Scrubbing", Ind. Eng. Chem. Res., 1997, vol. 36, pp. 2490-2493, American Chemical Society.
Resnik, Kevin P. et al., "Aqua Ammonia Process for Simultaneous Removal of CO2, SO2, and NOx", International Journal of Environmental Technology and Management, vol. 4, Nos. 1/2, 2004, 19 pp.
Corti, Andrea et al., "Reduction of Carbon Dioxide Emissions from a SCGT/CC by Ammonia Solution Absorption—Preliminary Results", International Journal Thermodynamics, Dec. 2004, vol. 7, No. 4, pp. 173-181.

* cited by examiner

*Primary Examiner* — Duane Smith
*Assistant Examiner* — Ives Wu
(74) *Attorney, Agent, or Firm* — The Webb Law Firm

(57) ABSTRACT

An apparatus and method for absorbing and recovering carbon dioxide from flue gas using ammonia water as an absorbent, including an absorption column and a circulation cooler connected to the absorption column so that a high-temperature absorbent is recovered from the absorption column, cooled to a preset temperature, and then supplied again into the absorption column, in order to dissipate absorptive heat generated when carbon dioxide is absorbed from the flue gas.

5 Claims, 7 Drawing Sheets

[FIG. 1]
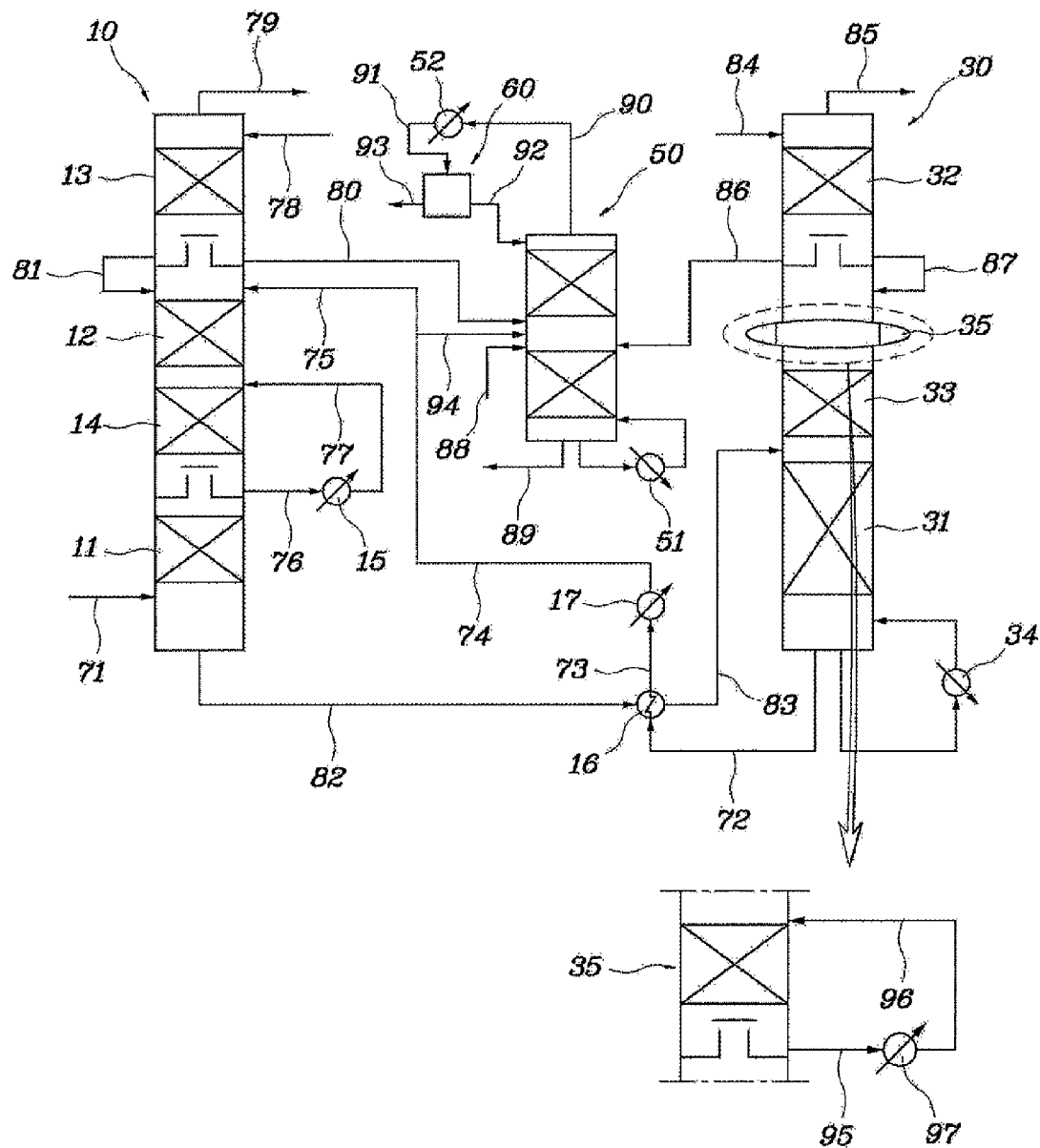

[FIG. 2]
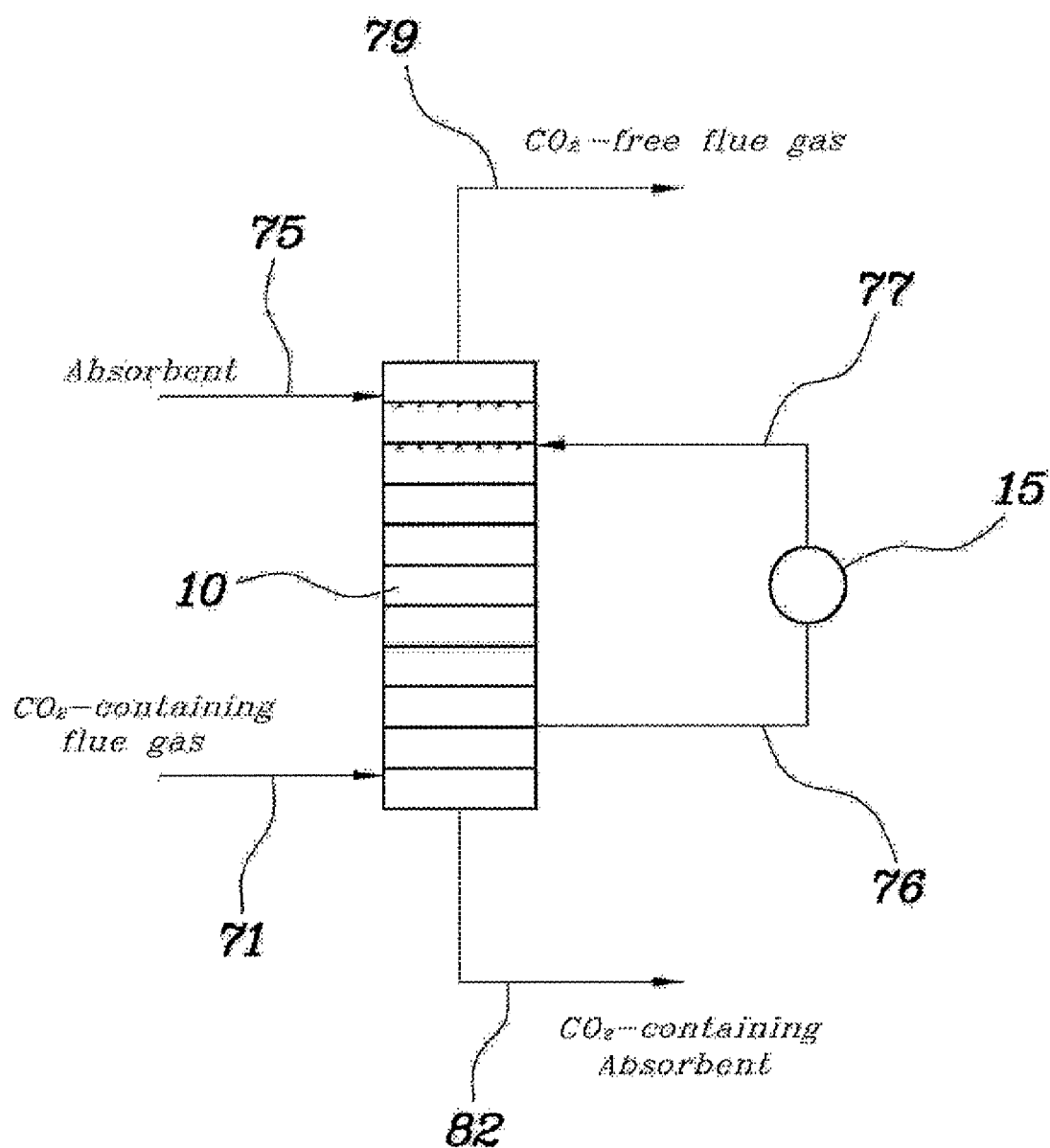

[FIG. 3]
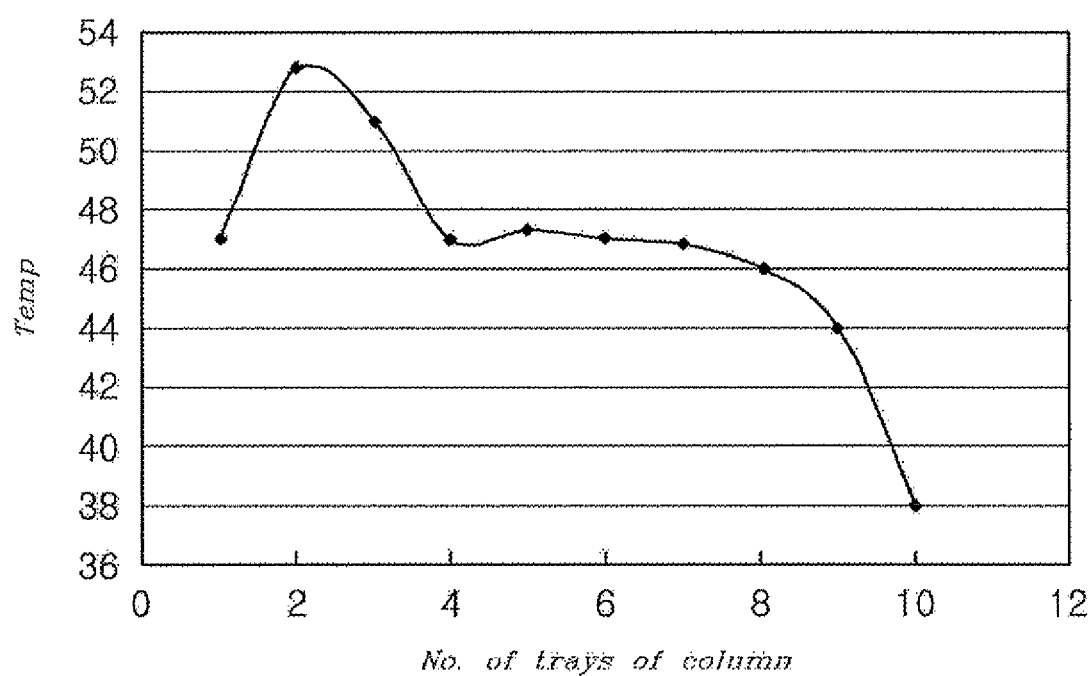

[FIG. 4]
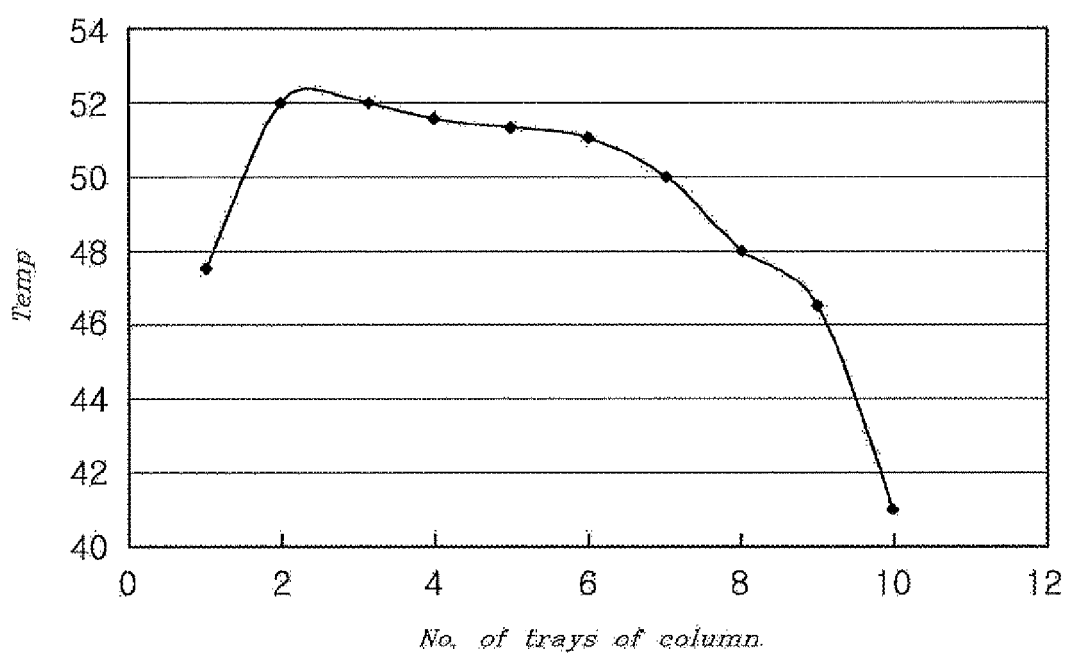

[FIG. 5]
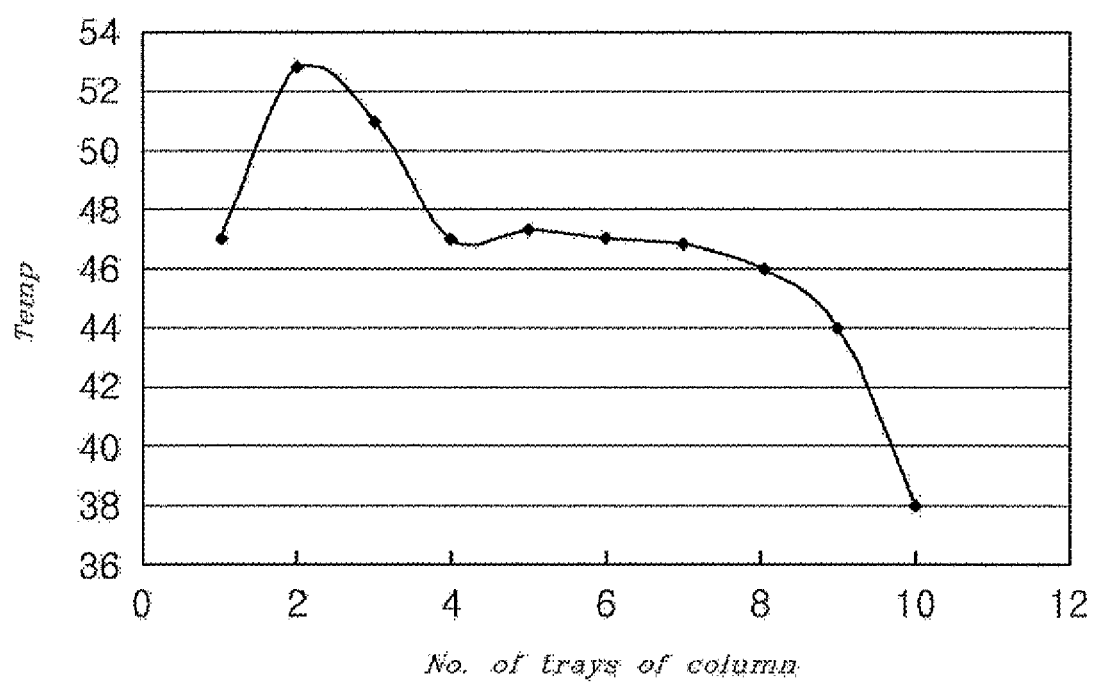

[FIG. 6]
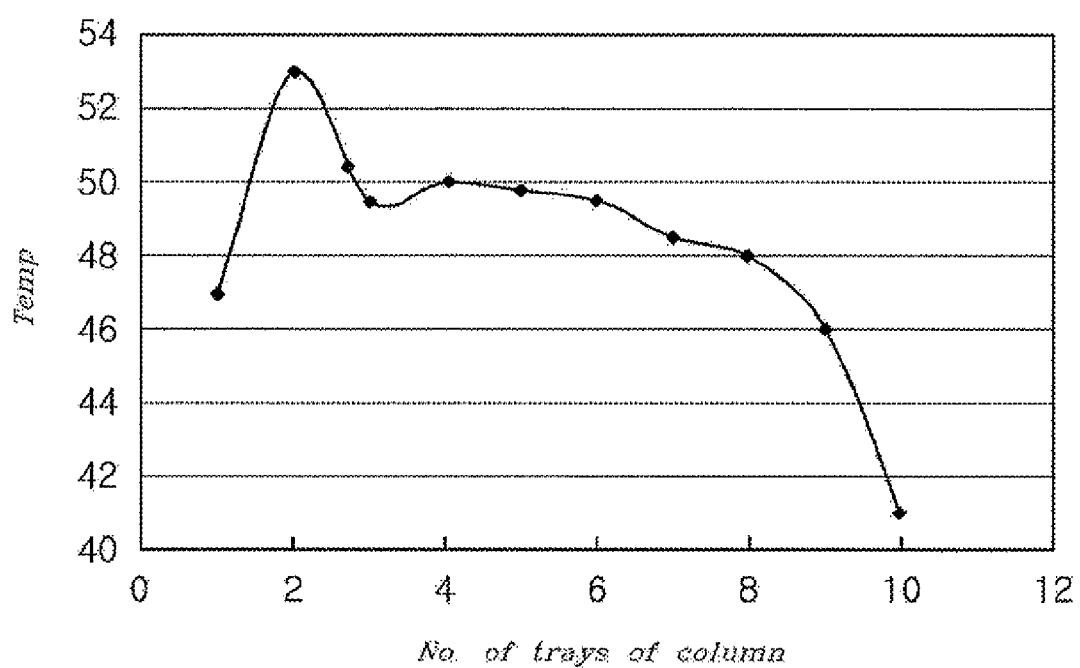

[FIG. 7]
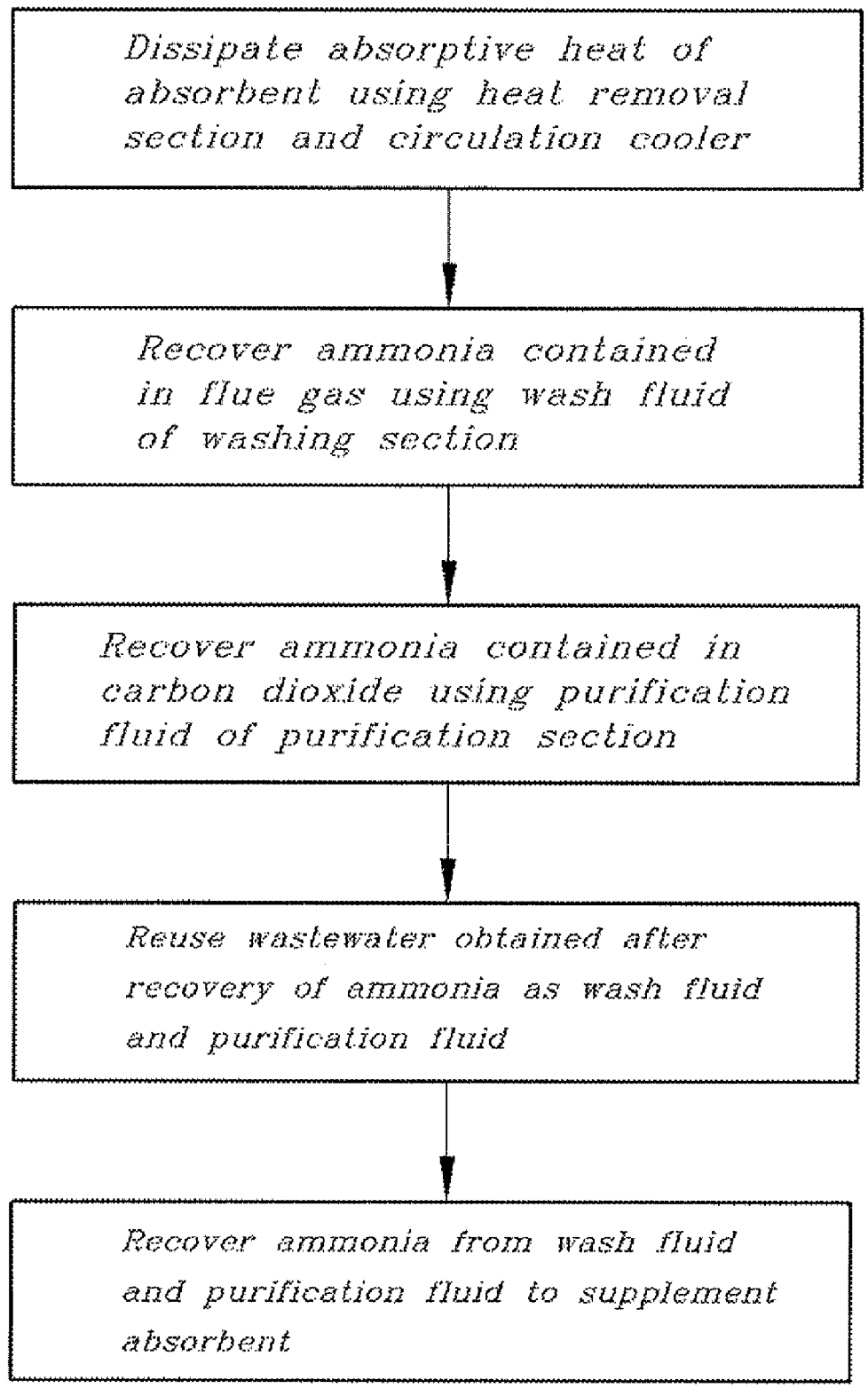

APPARATUS AND METHOD FOR RECOVERING CARBON DIOXIDE FROM FLUE GAS USING AMMONIA WATER

BACKGROUND OF THE INVENTION

1. Field of the Invention

The present invention relates to an apparatus and method for recovering carbon dioxide from flue gas using ammonia water, and more particularly, to an apparatus and method for recovering carbon dioxide from flue gas using ammonia water, in which absorptive heat, generated in the course of recovering carbon dioxide from flue gas using ammonia water, is effectively dissipated, and the generation of ammonia salt is minimized, thereby increasing recovery efficiency of carbon dioxide.

2. Description of the Related Art

Generally, methods of absorbing and recovering carbon dioxide from flue gas include adsorption, absorption, and membrane separation.

Among these methods, the absorption method is a process of absorbing and recovering carbon dioxide from flue gas using an absorbent. As such, the absorbent is typically exemplified by an amine-based compound. However, the case where the amine-based compound is used as the absorbent suffers because the amine-based compound is expensive, undesirably increasing treatment costs, and also, because a mechanical system for absorbing and separating carbon dioxide from flue gas is corroded by the amine-based compound, undesirably requiring maintenance.

For these reasons, these days, as an absorbent for absorbing and recovering carbon dioxide from flue gas, ammonia water is receiving attention. This is because ammonia water is relatively inexpensive and mitigates the corrosion problems afflicting the mechanical system for absorbing and separating carbon dioxide from flue gas, which are not experienced when using the amine-based compound. Thus, when ammonia water is used as an absorbent, the total system scale is decreased, and energy consumption may be reduced.

Bai and Yeh reported a method of absorbing and recovering carbon dioxide using ammonia water (Ind. Eng. Chem. Res. 1997, vol. 36, pp. 2490), and also, Resnik et al reported a process for absorbing carbon dioxide using ammonia water, called an aqua ammonia process (Int. J. of Env. Technology & Management, vol. 4, No. 1).

Korean Patent No. 10-0703999 discloses a process for absorbing carbon dioxide, comprising supplying 5~15 wt % of an ammonia-water solution to the upper portion of a first absorption column at 20~40° C., supplying a carbon dioxide-containing gas mixture to the lower portion of the first absorption column so that carbon dioxide contained in the gas mixture is absorbed in ammonia water, transferring ammonia water, to which carbon dioxide is absorbed, to a stripping column so that carbon dioxide is stripped through heating to 70~88° C., cooling the ammonia water from which carbon dioxide is stripped using a heat exchanger to thus circulate it again to the first absorption column, and supplying stripped carbon dioxide to a third absorption column so that ammonia contained in carbon dioxide is removed using water, thereby absorbing carbon dioxide.

However, the absorption process disclosed in the above patent is similar to a conventional process (Int. J. of Thermodynamics, vol. 7, pp. 173-181). As well, although problems related to the loss of ammonia are solved by providing each of the absorption column and the regeneration column with an additional washing column to recover ammonia therefrom, ammonia partially reacts with carbon dioxide to thus produce ammonia salt at low temperatures, thereby causing line clogging problems in the absorption column and the regeneration column.

Water, which is used to recover ammonia gas from the absorption column and the regeneration column, contains a large amount of ammonia. This ammonia is concentrated again in a concentration column, but ammonia thus concentrated is introduced into the lower portion of the regeneration column, and thus the concentration of ammonia is difficult to maintain uniform in the regeneration column. Further, water containing ammonia is fed into the upper portion of the regeneration column. Accordingly, the case where a reboiling process is performed in the regeneration column is problematic in that a lot of energy must be supplied.

Due to the generation of absorptive heat in the course of absorbing carbon dioxide using ammonia water, the temperature inside the absorption column is increased. When the temperature is increased, ammonia contained in the ammonia water is volatilized before carbon dioxide is collected in the absorbent, and is then discharged outside the absorption column along with flue gas, drastically decreasing carbon dioxide absorption efficiency in the absorption column.

Further, the above conventional methods are mainly related to the amount of carbon dioxide that is absorbed by ammonia and such reaction rates based on the fact that ammonia is used to absorb carbon dioxide, and may thus be experimentally performed, in which the ammonia water used has a very high ammonia concentration ranging from 5% to 21%.

However, when high-concentration ammonia water is applied to an actual process, problems attributable to the highly volatile nature of ammonia occur. That is, because ammonia is highly volatile, it is easily volatilized even when allowed to stand in the air. Hence, the case where high-concentration ammonia water is used is disadvantageous because a considerable amount of ammonia comes into contact with gas in the upper portion of the absorption column before it functions as an absorbent in the absorption column, and is thus volatilized.

Moreover, as mentioned above, the temperature inside the absorption column is increased due to the generation of absorptive heat in the course of absorbing carbon dioxide using ammonia water, and this increase in the temperature further promotes the volatilization of ammonia, remarkably deteriorating the effects of using high-concentration ammonia water.

SUMMARY OF THE INVENTION

Accordingly, the present invention has been made keeping in mind the above problems occurring in the related art, and provides an apparatus for recovering carbon dioxide from flue gas using ammonia water, in which a high-temperature absorbent is circulated out of an absorption column and is cooled by a circulation cooler connected to the absorption column so that the temperature of the absorbent is decreased, thereby preventing the volatilization of ammonia, resulting in increased carbon dioxide absorption efficiency.

In addition, the prevent invention provides an apparatus and method for recovering carbon dioxide from flue gas using ammonia water, in which a washing section and a purification section are integrated with the upper portions of an absorption column and a regeneration column, respectively, so that ammonia contained in flue gas is recovered, thereby fundamentally preventing the clogging of gas lines with ammonia salt.

According to the present invention, an apparatus for absorbing and recovering carbon dioxide from flue gas using ammonia water as an absorbent may comprise an absorption column and a circulation cooler connected to the absorption column, so that a high-temperature absorbent is recovered from the absorption column, cooled to a preset temperature, and is then supplied again into the absorption column, in order to dissipate absorptive heat generated when carbon dioxide is absorbed from the flue gas.

In addition, an apparatus for absorbing and recovering carbon dioxide from flue gas using ammonia water as an absorbent may comprise an absorption column including a washing section integrated therewith, so that ammonia contained in flue gas from which carbon dioxide is removed by the absorbent is washed and recovered.

In addition, an apparatus for absorbing and recovering carbon dioxide from flue gas using ammonia water as an absorbent may comprise a regeneration column including a purification section integrated therewith, so that carbon dioxide is removed from the absorbent to regenerate the absorbent, and ammonia contained in the removed carbon dioxide is purified and recovered.

In addition, an apparatus for absorbing and recovering carbon dioxide from flue gas using ammonia water as an absorbent may comprise an absorption column including a washing section integrated therewith so that ammonia contained in the flue gas from which carbon dioxide is removed by the absorbent is washed and recovered; a regeneration column including a purification section integrated therewith so that carbon dioxide is removed from the absorbent to regenerate the absorbent and ammonia contained in the removed carbon dioxide is purified and recovered; and a concentration column for concentrating and recovering ammonia from wash fluid and purification fluid discharged from the absorption column and the regeneration column, respectively.

In addition, according to the present invention, in a method of absorbing and recovering carbon dioxide from flue gas using ammonia water as an absorbent by means of an apparatus for recovering carbon dioxide comprising an absorption column including a washing section integrated therewith, so that ammonia contained in the flue gas from which carbon dioxide is removed by the absorbent is washed and recovered, a regeneration column including a purification section integrated therewith, so that carbon dioxide is removed from the absorbent to regenerate the absorbent and ammonia contained in the removed carbon dioxide is purified and recovered, and a concentration column for concentrating and recovering ammonia from wash fluid and purification fluid discharged from the absorption column and the regeneration column, respectively, the method may comprise recovering part or all of wastewater discharged from a lower portion of the concentration column to reuse it as wash fluid or purification fluid.

BRIEF DESCRIPTION OF THE DRAWINGS

FIG. 1 is a schematic view showing an apparatus for recovering carbon dioxide using ammonia water according to the present invention;

FIG. 2 is a schematic view showing an absorption column, which is connected with a circulation cooler, according to the present invention;

FIG. 3 is a graph showing the distribution of the temperature inside a conventional absorption column depending on the number of trays therein;

FIG. 4 is a graph showing the distribution of the temperature inside the absorption column depending on the number of trays therein, according to a first embodiment of the present invention;

FIG. 5 is a graph showing the distribution of the temperature inside the absorption column depending on the number of trays therein, according to a second embodiment of the present invention;

FIG. 6 is a graph showing the distribution of temperature inside the absorption column depending on the number of trays therein, according to a third embodiment of the present invention; and FIG. 7 is a flowchart showing a process of recovering carbon dioxide using ammonia water according to the present invention.

DESCRIPTION OF THE PREFERRED EMBODIMENTS

Hereinafter, a detailed description will be given of the present invention, with reference to the accompanying drawings.

FIG. 1 schematically illustrates the apparatus for recovering carbon dioxide using ammonia water according to the present invention.

As illustrated in FIG. 1, the apparatus according to the present invention broadly includes an absorption column 10, a regeneration column 30, and a concentration column 50.

The absorption column 10, into or from which flue gas is fed or discharged, includes a first absorption section 11 and a second absorption section 12, which are sequentially disposed upward and through which flue gas is passed.

A gas feed line 71 for feeding external flue gas is provided at a predetermined position in the lower portion of the absorption column 10. The flue gas, which flows upward through the first absorption section 11 and the second absorption section 12, comes into contact with an absorbent, which is fed via a lean absorbent feed line 75 and then flows downward through the first absorption section 11 and the second absorption section 12, thereby absorbing carbon dioxide contained in flue gas to the absorbent to thus remove it.

The absorbent containing carbon dioxide is fed into the regeneration column 30 through a rich absorbent out line 82, and the flue gas from which carbon dioxide is removed is passed through a washing section 13, mentioned below, and is then discharged through a washed air out line 79.

As such, the absorbent fed into the absorption column 10 is ammonia water, and the temperature of the absorbent fed into the absorption column 10 is preferably set to 20~40° C. In an embodiment of the present invention, the first absorption section 11 and the second absorption section 12 are sequentially disposed in the absorption column 10. Alternatively, the number of absorption sections in the absorption column 10 may be three or more, but the present invention is not limited to any number thereof.

According to a technical characteristic of the present invention, in order to dissipate absorptive heat generated when carbon dioxide is absorbed from the flue gas, a circulation cooler 15 is connected to the absorption column 10 so that a high-temperature absorbent is recovered from the absorption column 10, cooled to a preset temperature, and then supplied again to the absorption column 10.

Below, the construction of the circulation cooler 15 and the effect thereof are described in detail with reference to FIGS. 2 to 6.

In the absorption column 10, a plurality of trays may be aligned at predetermined intervals. In place of such trays, a construction using filler material may be adopted. The tray includes, for example, a sieve and screen, which are typically known in the art. In the case of filler material, any one may be used, as long as it is typically known in the art.

As mentioned above, the absorbent, fed into the upper portion of the absorption column 10 through the lean absorbent feed line 75, is moved toward the lower portion of the absorption column 10 while passing through the trays. The flue gas containing carbon dioxide, which is fed into the low portion of the absorption column 10 through the gas feed line 71, is moved toward the upper portion of the absorption column 10 while passing through the trays.

In this course, as the absorbent, ammonia water comes into contact with carbon dioxide in the flue gas so that carbon dioxide is absorbed by the absorbent. The absorbent containing carbon dioxide is discharged through the rich absorbent out line 82, while the flue gas, from which carbon dioxide has been removed, is discharged through the washed air out line 79.

As such, the reaction between ammonia water and carbon dioxide generates heat. Such absorptive heat increases the volatile properties of ammonia and thus decreases carbon dioxide absorption efficiency, as mentioned above.

With the goal of solving this problem, a cooling absorbent out line 76 is connected at the predetermined position of the absorption column 10, and preferably at the position of the absorption column 10 at which the temperature is the highest, so that the high-temperature absorbent is eliminated outside. The absorbent, eliminated outside the absorption column 10 through the cooling absorbent out line 76, is cooled by the circulation cooler 15. Then, the absorbent cooled by the circulation cooler 15 is supplied again into the absorption column 10 through a cooled absorbent feed line 77, which is provided at the predetermined position of the absorption column 10, and preferably at a position of the absorption column 10 which is higher than the position of the cooling absorbent out line 76.

In this way, when part of the high-temperature absorbent is discharged outside the absorption column, cooled to an appropriate temperature, and then supplied again to the predetermined position of the absorption column, the temperature inside the absorption column is decreased, whereby the amount of ammonia that is volatilized before coming into contact carbon dioxide is decreased, greatly increasing the carbon dioxide absorption efficiency.

In order to evaluate the technical effect of the circulation cooler 15 according to the present invention, the following comparative experiments were conducted.

COMPARATIVE EXAMPLE

The size of an absorption column was set to a diameter of 50 mm and a height of 1500 mm, and, as the filler material inside the absorption column, a 6 mm Raschig ring was used. The absorption column was composed of a total of ten trays, each tray being 150 mm thick.

In the test conditions, a model gas comprising 25 vol % of carbon dioxide and 75 vol % of nitrogen was used, and the model gas was fed into the absorption column at a flow rate of 30000 cc/min. Further, the absorbent was ammonia water, having a concentration of 4 wt %, and the flow rate of the absorbent was 300 cc/min.

A test was performed under the above conditions, and the carbon dioxide absorption efficiency was determined to be 70%. The temperature distribution in the absorption column is shown in FIG. 3.

Next, carbon dioxide absorption tests were conducted through the method of the present invention using the absorption column of FIG. 2, as specified in Examples 1 to 3.

Example 1

An absorption column having the same structure and size as in the comparative example and a model gas having the same composition were used, and the absorbent was recovered from the fourth tray from the top of the absorption column, in which the temperature was the highest, cooled to 30° C., and then supplied again to the fourth tray from the top thereof. As such, the amount of the absorbent that was recovered was $1/6$ of the amount initially fed to the absorption column.

As the result of Example 1, the temperature distribution inside the absorption column is depicted in FIG. 4. The carbon dioxide absorption efficiency was determined to be 88%.

Example 2

An absorption column having the same structure and size as in the comparative example and a model gas having the same composition were used, and the absorbent was recovered from the fourth tray from the top of the absorption column, in which the temperature was the highest, cooled to 20° C., and then supplied again to the fourth tray from the top thereof. As such, the amount of the absorbent that was recovered was $1/3$ of the amount initially fed to the absorption column.

As the result of Example 2, the temperature distribution inside the absorption column is depicted in FIG. 5. The carbon dioxide absorption efficiency was determined to be 91%.

Example 3

An absorption column having the same structure and size as in the comparative example and a model gas having the same composition were used, and the absorbent was recovered from the fourth tray from the top of the absorption column, in which the temperature was the highest, cooled to 25° C., and then supplied again to the third tray from the top thereof. As such, the amount of the absorbent that was recovered was $1/3$ of the amount initially fed to the absorption column.

As the result of Example 3, the temperature distribution inside the absorption column is depicted in FIG. 6. The carbon dioxide absorption efficiency was determined to be 91%.

As is apparent from Examples 1 to 3, part of the high-temperature absorbent was recovered and cooled by the circulation cooler, and was then supplied again into the absorption column, and thereby, the carbon dioxide absorption efficiency was remarkably increased compared to that of the comparative example.

In the present invention, the amount of the absorbent that is recovered for cooling is preferably set to $1/6$ to $1/3$ of the amount initially fed to the absorption column. When the recovered amount is smaller than $1/6$, it is difficult to decrease the temperature inside the absorption column to an appropriate level. Conversely, when the recovered amount is greater than $1/3$, the size of the cooler for cooling the recovered absorbent is excessively increased.

When the circulation cooler of the present invention is used, the carbon dioxide absorption efficiency is greatly increased. Moreover, even though ammonia water, having a low concentration of 4 wt % or less, is used as the absorbent, the same effect as in the conventional case, in which high-concentration ammonia water is used, can be obtained. Preferably, the absorbent includes ammonia water having a concentration of 1~4 wt %. When the concentration of ammonia water is less than 1 wt %, a sufficient amount of carbon dioxide is not absorbed, which is undesirable. Conversely, when the concentration exceeds 4 wt %, the amount of ammonia to be volatilized is increased, which is undesirable.

Further, the absorbent is preferably recovered from the portion of the absorption column in which the temperature is the highest. Also, it is preferred that the cooled absorbent be supplied again to a position at a level the same as or higher than the position where the high-temperature absorbent is recovered. Thereby, the cooled absorbent is passed through the portion of the absorption column in which the temperature is the highest, thus further increasing the cooling effect of the absorption column.

The absorbent recovered from the absorption column is preferably cooled to 20~30° C. When the absorbent is cooled to too low a temperature, the capacity of the circulation cooler must be increased, which is undesirable. Conversely, when the absorbent is not cooled to a sufficiently low temperature, the cooled absorbent does not function to decrease the temperature inside the absorption column to a desired level even when supplied again into the absorption column. Ultimately, the carbon dioxide absorption efficiency is not increased.

In the absorption column 10, a heat removal section 14 may further be provided. More specifically, as shown in FIG. 1, the heat removal section 14 is disposed between the first absorption section 11 and the second absorption section 12 of the absorption column 10, in order to decrease the temperature inside the absorption column 10 and the temperature of the absorbent for absorbing and removing carbon dioxide through contact with flue gas.

The heat removal section 14 plays roles in dissipating absorptive heat generated in the absorption column, and in decreasing the temperature of the absorbent to a predetermined value along with the circulation cooler 15, thereby increasing carbon dioxide absorption efficiency.

According to the present invention, in order to dissipate absorptive heat, the circulation cooler 15 may be used alone, without the heat removal section 14, or alternatively, in order to increase the cooling effect, the circulation cooler 15, which is connected with the cooled absorbent feed line 77 and the cooling absorbent out line 76, linked to the upper and lower portions of the heat removal section 14, may be used along with the heat removal section 14.

As shown in FIG. 1, in an embodiment of the present invention, the temperature of the absorbent may be decreased to a predetermined value using one circulation cooler 15 provided at the side of one heat removal section 14. Alternatively, pluralities of heat removal sections 14 and circulation coolers 15 may be provided, further increasing the cooling effect of the absorbent.

According to another technical characteristic of the present invention, as seen in FIG. 1, a washing section 13 is integrated with the upper portion of the absorption column 10, so that ammonia contained in flue gas, from which carbon dioxide is removed by the absorbent, is washed and recovered.

More specifically, the washing section 13, for washing the flue gas passed through the absorption sections 11, 12, is provided above the second absorption section 12. That is, the washing section 13 for removing and recovering a large amount of ammonia contained in the flue gas, from which carbon dioxide is removed by passing it through the first and second absorption sections 11, 12, is disposed above the second absorption section 12.

To this end, a wash fluid feed line 78 is provided at the upper portion of the washing section 13, and wash fluid is thus supplied through the wash fluid feed line 78. The wash fluid is typically exemplified by water, but any fluid may be used as long as it may absorb and remove ammonia contained in flue gas through contact with flue gas.

After ammonia contained in flue gas is removed using the wash fluid, the washed flue gas is discharged outside through a washed air out line 79 provided at the upper surface of the washing section 13.

According to the present invention, the washing section 13 is integrated with the upper portion of the absorption column 10, thereby facilitating the removal of ammonia contained in the flue gas without the need to mount an additional device for removing ammonia contained in the flue gas. Using the washing section 13 thus constructed, all of the ammonia contained in the flue gas is removed, and thus the washed air out line 79 may be prevented from being clogged due to the formation of ammonia salt.

Further, a wash fluid feed line 81 is provided at the lower portion of the washing section 13 so that ammonia salt is prevented from being formed in the middle portion of the absorption column 10 and the concentration of ammonia in the absorbent that is circulated is maintained.

Furthermore, a wash fluid out line 80 is provided at the lower portion of the washing section 13 so that wash fluid containing ammonia which is absorbed and removed from the flue gas through contact with the absorbent is discharged, and the wash fluid out line 80 is connected to the concentration column 50. The wash fluid fed into the concentration column 50 through the wash fluid out line 80 may be reused after ammonia contained therein is removed.

The absorption column 10 with the washing section 13 therein may be further provided with the circulation cooler 15 and the heat removal section 14 so as to effectively dissipate absorptive heat.

Also, between the absorption column 10 and the regeneration column 30, an absorbent heat exchanger 16 and a lean absorbent cooler 17 are disposed. The absorbent heat exchanger 16 is connected to the lower surface of the absorption column 10 through a rich absorbent out line 82, is connected to the lower surface of the regeneration column 30 through a lean absorbent out line 72, and is also connected to the regeneration column 30 through a rich absorbent feed line 83.

The absorbent heat exchanger 16 and the lean absorbent cooler 17 are connected to each other via a pre-cooled lean absorbent line 73, and the lean absorbent cooler 17 is connected to the lower portion of the washing section 13 of the absorption column 10 through a cooled lean absorbent line 74 and a lean absorbent feed line 75.

Part of ammonia water passing through the cooled lean absorbent line 74 is transferred into the concentration column 50 through a blow down line 94 in order to remove the ammonia salt.

The regeneration column 30, which is responsible for removing carbon dioxide from the absorbent having carbon dioxide absorbed in the absorption column 10 so as to reuse the absorbent, includes a stripping section 31, a purification section 32, and a rectification section 33.

The stripping section 31 functions to strip carbon dioxide from the absorbent to which carbon dioxide is absorbed, which is supplied from the absorption column 10. That is, the absorbent heat exchanger 16 is connected to the upper portion of the stripping section 31 through the rich absorbent feed line 83, so that the absorbent, to which carbon dioxide is absorbed, is fed from the absorption column 10 and carbon dioxide is stripped from the absorbent fed through the rich absorbent feed line 83.

As such, the stripping temperature of the regeneration column 30 may vary depending on the concentration of the absorbent, and preferably falls in the range of 80~100° C. A regeneration column reboiler 34 is connected at the side of the stripping section 31. This regeneration column reboiler 34 acts to strip almost all carbon dioxide from the absorbent which is fed into the regeneration column 30 from the absorption column 10.

According to a further technical characteristic of the present invention, the purification section 32 is located above the stripping section 31, so that ammonia contained in carbon dioxide stripped from the absorbent is recovered.

In order to recover ammonia from carbon dioxide which is stripped from the absorbent, the purification section 32 is operated using purification fluid. To supply purification fluid into the purification section 32, a purification fluid feed line 84 is connected at one side of the upper portion of the purification section 32. Further, a carbon dioxide out line 85 is provided at the upper end of the purification section 32, so that carbon dioxide ($CO_2$), from which ammonia has been recovered, is discharged.

In the purification section 32 thus constructed, all ammonia contained in carbon dioxide is removed, and thus the clogging of the carbon dioxide out line 85 due to the formation of ammonia salt therein may be prevented.

A purification fluid out line 86, which is connected with the concentration column 50, is provided at one side of the lower portion of the purification section 32, and the purification fluid containing ammonia recovered in the purification section 32 of the regeneration column 30 is supplied into the concentration column 50 via the purification fluid out line 86.

Further, a regenerating purification fluid feed line 87 is provided at the lower portion of the purification section 32 in order to prevent the formation of ammonia salt in the middle portion of the regeneration column 30 and to maintain the concentration of ammonia water which is circulated.

Also, the rectification section 33 is disposed between the stripping section 31 and the purification section 32 so that ammonia is recovered from the gas generated in the stripping section 31 and the purity of carbon dioxide is increased.

Furthermore, a regeneration column condenser 35 is disposed between the purification section 32 and the rectification section 33, so that a large amount of saturated water vapor occurring in the regeneration column 30 and ammonia contained therein are recovered. The regeneration column condenser 35, which is composed of a packing or tray, functions to condense saturated water vapor to thereby recover ammonia.

Into the concentration column 50, the wash fluid of the absorption column 10 and the purification fluid of the regeneration column 30 are fed, whereby ammonia is concentrated and recovered to reuse it and wastewater is discharged outside or reused.

To this end, the concentration column 50 is provided with a concentration column reboiler 51 at the side of the lower portion thereof, and with a concentration column condenser 52 and a concentration column condensate drum 60 at the side of the upper portion thereof.

Further, a raw ammonia feed line 88 is connected at one side of the concentration column 50. To compensate for the ammonia water, which is lost through the wastewater out line 89, the washed air out line 79 and the carbon dioxide out line 85, the concentration column 50 is replenished with ammonia water via the raw ammonia feed line 88.

As such, the concentration of ammonia in wastewater discharged through the wastewater out line 89 of the concentration column 50 may be adjusted, and the concentration of ammonia is preferably adjusted to 500 ppm or less.

The concentration column condensate drum 60 plays a role in reusing ammonia concentrated in the concentration column 50, so that ammonia, which is recovered from the wash fluid and purification fluid supplied into the concentration column 50 and then condensed in the concentration column condenser 52, is supplied to the absorption column 10 to supplement the absorbent.

To this end, an ammonia supplementation line 93 is connected at one side of the concentration column condensate drum 60, and ammonia is supplied into the absorption column 10 via the ammonia supplementation line 93 to supplement the absorbent.

In FIG. 1, the apparatus comprising the absorption column 10, the regeneration column 30, and the concentration column 50 connected to each other to recover carbon dioxide from flue gas using ammonia water is illustrated, but the absorption column 10, the regeneration column 30, and the concentration column 50 may be separately used.

Below, the method of recovering carbon dioxide using ammonia water according to the present invention is briefly described with reference to FIG. 7.

First, flue gas containing carbon dioxide is fed into the absorption column 10 through the gas feed line 71 connected thereto. While the fed flue gas is moved upward through the first absorption section 11 and the second absorption section 12, it comes into contact with the absorbent flowing downward through the lean absorbent feed line 75. In the course thereof, carbon dioxide contained in the flue gas is absorbed by the absorbent and the absorbent is collected in the lower portion of the absorption column 10.

The absorptive heat generated in the course of bringing the absorbent into contact with carbon dioxide contained in flue gas to absorb carbon dioxide is dissipated through the heat removal section 14 and the circulation cooler 15 connected thereto. In this way, the increase in the temperature inside the absorption column 10 may be prevented using the heat removal section 14 and the circulation cooler 15, thereby increasing carbon dioxide absorption efficiency.

Further, ammonia contained in the flue gas from which carbon dioxide is removed is recovered through contact with wash fluid of the washing section 13. In this way, in the absorption column 10, carbon dioxide and ammonia are absorbed and removed using the absorbent and wash fluid, thus obtaining discharge gas, which is then discharged outside via the washed air out line 79. The absorbent collected in the lower portion of the absorption column 10 is supplied into the regeneration column 30.

The absorbent supplied into the regeneration column 30 is passed through the stripping section 31, so that carbon dioxide is stripped therefrom. While the absorbent containing carbon dioxide is circulated by the regeneration column reboiler 34, carbon dioxide is completely stripped therefrom. Further, ammonia, which is contained in carbon dioxide stripped from the absorbent, is brought into contact with the wash fluid of the washing section 32, and is thus recovered.

Further, the absorbent from which carbon dioxide is removed and which is regenerated is supplied into the absorption column 10 via the regenerated absorbent out line 72, and the pre-cooled absorbent line 73, the cooled lean absorbent line 74, and the regenerated absorbent feed line 75, which are sequentially connected to the lean absorbent out line 72.

The large amount of saturated water vapor occurring in the regeneration column 30 is condensed by the regeneration column condenser, so that ammonia contained therein is recovered.

Carbon dioxide from which ammonia is absorbed using the purification fluid of the purification section 32 is discharged outside and recovered. Also, the wash fluid and purification fluid, which are supplied into the concentration column 50 through the wash fluid out line 80 of the absorption column 10 and the purification fluid out line 86 of the regeneration column 30, are subjected to ammonia recovery in the concentration column 50, and thus all or part thereof may be reused as wash fluid or purification fluid.

That is, in the course of circulating the wash fluid and purification fluid supplied into the concentration column 50 by the concentration column reboiler 51, almost all ammonia contained in the wash fluid and purification fluid is recovered, and wastewater resulting from the recovery of ammonia in the concentration column 50 is fed again into the washing section of the absorption column and the purification section of the regeneration column, and is thus reused as the wash fluid and purification fluid.

Further, ammonia recovered from the wash fluid and purification fluid is supplied into the concentration column condensate drum 60 through the concentrated ammonia vapor out line 90. The recovered ammonia is condensed through the concentration column condenser 52, and the condensed ammonia is supplied into the absorption column.

Below, the apparatus and method according to the present invention are described in more detail through the following example, which is set forth to illustrate, but is not to be construed as the limit of the present invention.

Example 4

Through the gas feed line 71, provided at one side of the lower portion of the absorption column 10, a gas mixture containing 25 vol % of carbon dioxide ($CO_2$) based on the total weight thereof was supplied into the absorption column 10, and then an absorption test was conducted using ammonia water. The results are as follows.

When the washing section 13 and the purification section 32 were not operated in the absorption column 10 and the regeneration column 30, respectively, ammonia in the flue gas had a high concentration in the range of 0.6~1.6 wt %. However, when small amounts of wash fluid and purification fluid composed of water were supplied into the washing section 13 and the purification section 32, the concentration of ammonia was drastically decreased to 2~10 ppm.

Further, the carbon dioxide removal efficiency in the absorption column 10 was determined to be 80~95%. As such, the carbon dioxide removal efficiency varied depending on the amount of flue gas supplied and the amount of absorbent supplied. The concentration of carbon dioxide discharged through the carbon dioxide out line 85 of the regeneration column 30 was measured to be 94~99%.

In the case where the circulation cooler 15 was used in the absorption column 10, the absorption efficiency was increased by 10% or more compared to the case where the circulation cooler 15 was not used. Also, when the regeneration column condenser 35 was used in the regeneration column 30, the ammonia emission concentration was drastically decreased compared to when the regeneration column condenser 35 was not used.

In the case where the washing section 13 and the purification section 32, respectively provided in the upper portions of the absorption column 10 and the regeneration column 30, were not operated, a considerable amount of ammonia salt was produced in the washed air out line 79 and the carbon dioxide out line 85 after a predetermined time, undesirably causing problems of partial clogging of the washed air out line 79 and carbon dioxide out line 85. However, in the case where the washing section 13 of the absorption column 10 and the purification section 32 of the regeneration column 30 were operated, the line clogging phenomenon did not occur.

Depending on the temperature conditions of the regeneration column 30, it is possible for the rectification section 33 to be used for stripping purposes, along with the stripping section 31. That is, a rich absorbent feed line 83 may be connected to the upper portion of the rectification section 33.

Further, the concentration of ammonia in wastewater discharged through the wastewater out line 89 from the concentration column 50 was measured. As a result, the concentration of ammonia was measured to be 500 ppm or less. After this ammonia was cooled, it could be reused in the washing section 13 of the absorption column 10 and the purification section 32 of the regeneration column 30, thereby obviating and reducing the additional use of water as the wash fluid and purification fluid.

As described hereinbefore, the present invention provides an apparatus and method for recovering carbon dioxide from flue gas using ammonia water. According to the present invention, a high-temperature absorbent is circulated and cooled so that the temperature inside an absorption column can be effectively decreased, thus preventing the volatilization of ammonia, thereby increasing carbon dioxide absorption efficiency. Therefore, even when low-concentration ammonia water is used, the carbon dioxide absorption efficiency can be expected to be high. Further, a washing section and a purification section are integrated with the upper portions of the absorption column and the regeneration column, respectively, and thus, ammonia can also be recovered. Thereby, the generation of ammonia salt can be effectively prevented, thus preventing line clogging in the apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for absorbing and recovering carbon dioxide from flue gas using ammonia water as an absorbent, comprising:
   an absorption column including a washing section integrated therewith so that ammonia contained in the flue gas from which carbon dioxide is removed by the absorbent is washed and recovered;
   a regeneration column including a purification section integrated therewith so that carbon dioxide is removed from the absorbent to regenerate the absorbent and ammonia contained in the removed carbon dioxide is purified and recovered; and
   a concentration column for concentrating and recovering ammonia from wash fluid and purification fluid discharged from the absorption column and the regeneration column, respectively.

2. The apparatus as set forth in claim 1, wherein the absorption column is connected with a circulation cooler in order to dissipate absorptive heat generated when carbon dioxide is absorbed from the flue gas.

3. The apparatus as set forth in claim 1, wherein the absorption column is integrated with a circulation cooler and a heat removal section in order to dissipate absorptive heat generated when carbon dioxide is absorbed from the flue gas.

4. A method of absorbing and recovering carbon dioxide from flue gas using ammonia water as an absorbent by means of an apparatus for recovering carbon dioxide, comprising an absorption column including a washing section integrated therewith, so that ammonia contained in the flue gas from which carbon dioxide is removed by the absorbent is washed and recovered, a regeneration column including a purification section integrated therewith, so that carbon dioxide is removed from the absorbent to regenerate the absorbent and ammonia contained in the removed carbon dioxide is purified and recovered, and a concentration column for concentrating and recovering ammonia from wash fluid and purification fluid discharged from the absorption column and the regeneration column, respectively, the method comprising:

recovering part or all of wastewater discharged from a lower portion of the concentration column to reuse it as wash fluid or purification fluid.

5. The method as set forth in claim 4, wherein high-concentration ammonia water recovered from the concentration column is supplied into the absorption column to reuse it as the absorbent.

* * * * *